United States Patent [19]

Schippers et al.

[11] E Re. 29,959

[45] Reissued Apr. 10, 1979

[54] SIMULTANEOUS PRODUCTION OF PLURALITY OF FILAMENT WINDING PACKAGES

[75] Inventors: Heinz Schippers; Friedhelm Hensen; Erich Lenk, all of Remscheid, Fed. Rep. of Germany

[73] Assignee: Barmag Barmer Maschinenfabrik AG, Remscheid-Lennep, Fed. Rep. of Germany

[21] Appl. No.: 465,148

[22] Filed: Apr. 29, 1974

Related U.S. Patent Documents

Reissue of:

[64] Patent No.: 3,719,442
Issued: Mar. 6, 1973
Appl. No.: 91,850
Filed: Nov. 23, 1970

[30] Foreign Application Priority Data

Nov. 25, 1969 [DE] Fed. Rep. of Germany ..... 1959034

[51] Int. Cl.[2] ..... D01D 5/16

[52] U.S. Cl. ..... 425/66; 242/35.5 R; 425/72 S; 28/246

[58] Field of Search ..... 425/66, 72, 131.5; 28/71.3, 59.5, 71.4; 242/35.5 R; 264/103, 176 F, 210 F

[56] References Cited

U.S. PATENT DOCUMENTS

| | | | |
|---|---|---|---|
| 1,997,633 | 4/1935 | Dreyfus | 425/72 X |
| 2,002,066 | 5/1935 | Taylor | 425/66 |
| 2,161,354 | 6/1939 | Imray et al. | 425/72 S X |
| 2,887,843 | 5/1959 | Kline et al. | 28/72 |
| 2,955,017 | 10/1960 | Boyer | 425/68 |
| 3,277,228 | 10/1966 | Killoran et al. | 28/71.3 X |
| 3,317,980 | 5/1967 | Jaeggli | 28/71.3 |
| 3,538,722 | 11/1970 | Stream | 425/106 |
| 3,544,017 | 12/1970 | Schippers et al. | 242/35.5 R X |
| 3,555,139 | 1/1971 | Waters et al. | 264/176 F X |
| 3,577,308 | 5/1971 | Van Drunen et al. | 425/131.5 X |

FOREIGN PATENT DOCUMENTS

| | | | |
|---|---|---|---|
| 796918 | 10/1968 | Canada | 28/71.3 |
| 432088 | 3/1948 | Italy | 425/72 |
| 6286 | 5/1966 | Japan | 28/71.3 |

*Primary Examiner*—Robert D. Baldwin
*Attorney, Agent, or Firm*—John H. Shurtleff

[57] ABSTRACT

Simultaneous production of a large number of winding packages of filaments of flat, round or profiled cross section by apparatus including extrusion devices, at least one cooling device, guide means, after-treatment devices (stretching, heating, etc.) and winding devices.

17 Claims, 4 Drawing Figures

INVENTORS
HEINZ SCHIPPERS
FRIEDHELM HENSEN
ERICH LENK
BY Johnston, Root, O'Keeffe
Keil, Thompson & Shurtleff
ATTORNEYS INVENTORS
HEINZ SCHIPPERS
FRIEDHELM HENSEN
ERICH LENK
BY Johnston, Root, O'Keefe, Keil Thompson & Shurtleff
ATTORNEYS

INVENTORS
HEINZ SCHIPPERS
FRIEDHELM HENSEN
ERICH LENK
BY
ATTORNEYS

SIMULTANEOUS PRODUCTION OF PLURALITY OF FILAMENT WINDING PACKAGES

Matter enclosed in heavy brackets [ ] appears in the original patent but forms no part of this reissue specification; matter printed in italics indicates the additions made by reissue.

INTRODUCTION

In the production of profiled filaments in bundles by the extrusion process, hitherto it was the general practice to proceed from foils. The thermoplastic material to be processed, for example a polyamide, a polyester, polyethylene or polypropylene, is melted in the extruder. Then it is, directly or by means of a metering pump, fed to the extrusion nozzle. Thereafter, whether as a cohesive foil or groups of more or less cohesive individual structures, the filaments are stretched in common. Finally, after completion of longitudinal splitting into filaments, the latter are wound individually or in bundles. Such installations are already described, for example, in German Pat. Nos. 667,234 and 746,593; British Pat. No. 1,035,657, French Pat. No. 1,395,472, and Belgian Pat. No. 643,850. The disadvantage of such a manner of operation lies primarily in reoccurring production disruptions. For example, in the case of a so-called thread break or a lapping in the stretching assembly, there are considerable time losses caused by resetting or by stopping of the whole installation. There, furthermore, [there] is the drawback that this process is carried out only with considerable expenditure in machinery and space requirement to separate completely the extruded foils or groups of cohesive individual structures into individual filaments and then to supply them individually to the further treatment or after-treatment, for example, twisting, crimping, or the like.

Correspondingly, there exists a general need to reduce the production time losses for such profile strand bundles of a polyamide, a polyester, polyethylene or polypropylene and the like and to improve the economy of the process, especially in the production of binding tapes, cords and profile threads for technical and textile purposes and the like.

THE INVENTION

In order to satisfy these needs, the invention provides an annular or beam-type spinning apparatus having a plurality of spinning nozzles, as well as metering devices therefor, a cooling device or shaft for the extrusions, and also extrusion-deflection devices with the best possible space utilization for the large number of individual extrusions obtained from a melt. The after-treatment devices, such as guide rollers, draw-off mechanisms, heating devices, stretching mechanisms and winding devices are arranged contiguous to the devices serving for the extrusion of those structures. Each is allocated to certain, definite profile strands or bundles of profile strands.

In such a system it is possible with use of air cooling to achieve an especially compact type of construction, particularly if the cooling shaft is made so short that in it there occurs merely a solidification of the profile strands sufficient for the further treatment. Depending on the running speed of the strands, the shaft receives then only a length of 0.5 to 2 m. Directly at the discharge end of the shaft there is arranged there a moistening device for the profile strands, which provides for the final cooling and simultaneous preparation of the ribbon-type structures.

In certain cases it can be advantageous that all the profile strands generated in such an installation have an equal running time between their respective extrusions and their respective stretchings in the installation, independently of the distance between extrusion nozzle and stretching device. It is proposed, therefore, that between the parts which are allocated to all or at least to a large number of strands, and the subsequent parts, running times be provided by such dimensioning that the length of all the running paths is approximately equal regardless of the arrangement and the relative places of the after-treatment devices. These running time intervals are advantageously formed by corresponding deflection devices, over which the profile strands are conducted in respective loops wherein, the nearer the after-treatment devices are to the units common to all the profile strands, the greater length is the loop.

The proposed single-stage installations make it expedient, for example, in the production of tying yarns, cords, thread or fiber bundles, to include still further devices, for example, twisting devices, texturizing devices or the like in the installation. This saves still another working operation in the production of strand-form or ribbon-type structures. It has proved especially advantageous to arrange after the stretching mechanisms in each case a twist-winding device, preferably a ring-twist winding device. In a corresponding manner it can be advantageous to arrange on outlet side of the stretching mechanisms a texturizing device, for example, curling mechanisms consisting of two gear wheels, a false-twist device or the like. Further, it is contemplated to arrange the texturizing device, not after the last stretching roller, but between the two delivery mechanisms which together form the stretching mechanism. Finally, it has proved favorable if the extrusion installation for the generation of bicomponent profiles has two extruders fed with different thermoplastic materials. With such an installation it is possible to produce bicomponent profile strands, known in themselves, in which the generating of a crimping or curling effect is achieved directly, for example, by a corresponding selection of the components.

DESCRIPTIONS OF THE DRAWINGS

The invention is explained in detail in the following with the aid of the appended drawing.

THE ILLUSTRATED EMBODIMENTS

Figures 1, 4:
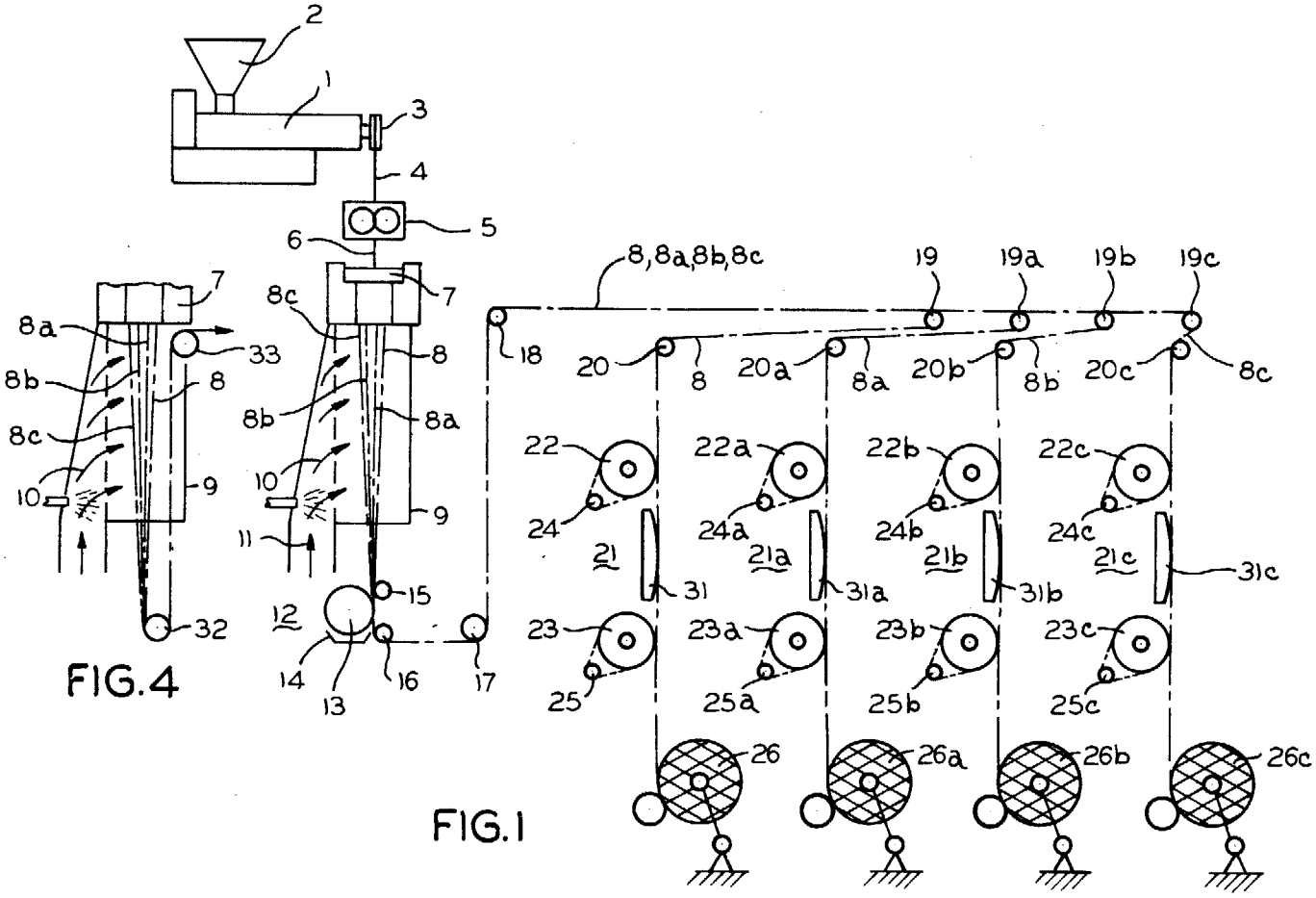
FIG. 1 is a schematic view of an installation according to the invention for the production of a large number of individually stretched monocomponent profile strands.
FIG. 4 is a schematic view of an alternative form of cooling shaft.

In FIG. 1 there is represented, first of all, an extruder 1, which serves for the melting of the thermoplastic to be extruded. The plastic is fed to the extruder via the filling funnel 2, and leaves it in a molten and possibly also degassed state through the discharge unit 3. The discharge unit 3 is connected by a melt line 4 with one or more conveyance and metering pumps 5. Depending on the performance capacity of the extruder, it is possible to supply with one machine several pumps, so that the formation of the melt line 4 and the number of branches will differ from case to case.

The conveyance and metering pumps 5 can in each case be connected over a special melt line 6 with the beam-type or annular nozzle unit 7. As a rule, however, the pumps will be joined with the unit 7 allocated in each case into one structural wall, so that the melt line 6 does not appear externally.

In the unit 7 there are arranged several nozzles in arbitrary arrangement, for example, in several rows next to one another. The nozzles are supplied as uniformly as possible with melt, so that from them there emerge numerous individual extrusion profiles 8, 8a, 8b, 8c, etc. They are conducted through as short as possible a cooling shaft 9. The cooling shaft 9 consists in the simplest case of two parallel walls which have between them the extrusion melt paths. On one side of the shaft thus formed there is an air feed device 10, which can be connected, for example, over a duct 11 with a blower (not represented). In this manner there is generated in the cooling shaft 9 an air stream which runs obliquely or approximately perpendicularly to the direction of travel of the profile strands. It withdraws from the still liquid or plastic profile strands such an amount of heat that they solidify sufficiently. By "sufficiently solidified" there is meant here such a cooling that the strands no longer are in a thermoplastic state, even though they have not as yet been cooled to room temperature. Through this measure the cooling shaft 9 can in actual fact be kept very short, whereby the installation is of substantially lesser height than heretofore used. Immediately below the shaft there is arranged a moistening device 12, through which the profile strands 8 are conducted in common and in which there is withdrawn their residual heat by contact with the finishing fluid. Here they also are rendered supple for the subsequent further treatment. The moistening device 12 consists, in a known manner, of a roller or shaft 13, which, for example, can be made of dull-chromed steel or of sintered ceramic material. The roller 13 can be set in slow rotation by a mechanism not represented. It rotates with its lower part in a liquid trough 14, in which there is situated the moistening and finishing fluid. In order that the strand structures running over the roller 13 come into contact with the roller surface, there are arranged, in a known manner, two contact pressure rollers or bars 15 and 16, which for example, can be made of steel or abrasion-proof ceramic material. The last contact pressure means 16 in running direction of the profile strands serves simultaneously for the deflection for the bundle [8], whose individual profile strands are now solidified to such a degree that they withstand without difficulty the deflection from the vertical into the horizontal. The strand bundle is then conducted over further deflection devices 17 and 18 and then sub-divided into suitable bundles of individual profile strands.

In the example of execution represented the endless ribbon-type profile strands are first generated in a vertical downward direction and, after sufficient cooling, are deflected with the aid of deflection devices 16, 17 and 18 from the vertical into the horizontal and finally back into the vertical. For practice of the invention it is not required that exact use be made of this arrangement, It is in each case a question of the available space, whether the after-treatment devices are arranged in more or less the same horizontal plane with the cooling shaft, or far above or below. Depending on the space conditions present, there varies correspondingly also the arrangement of the deflecting devices mentioned.

The group of individual strands 8, 8a, 8b, 8c at first run in common and then are fed to the deflecting devices 19–19c and 20–20c, through which several or also in each case only individual profile strands 8 are separated from the total group and supplied to the after-treatment devices 21. Another part 8a of the profile strands is separated out with the aid of the deflecting device 19a and 20a and supplied to the after-treatment device 21a. A further part 8b of the profile strands is separated out by the deflecting device 19b and 20b and supplied to the after-treatment device 21b, and finally a remaining part 8c is separated out through the deflecting devices 19c and 20c and supplied to the after-treatment device 21c. The deflecting devices belonging together in each case are disposed at such a distance from one another that the total path lengths in all the strand trains of the system are equal or at least approximately equal.

In order to achieve a space-saving and at all times easily accessible construction of the after-treatment devices, these are arranged adjacently, preferably side-by-side. The individual after-treatment devices have to be constructed at a different distance from the production assembly. If the ribbon-type profile strands were directly supplied to the after-treatment devices, then the path length and thereby the running time that the individual strand or the ground of individual strands undergoes in the after-treatment device 21 would be shorter than that in the other devices 21a, 21b, etc. In order to compensate this, through the deflecting devices 19–19c and 20–20c, there have been created running paths of substantially uniform lengths between deflection device 18 and devices 21–21c, which balance out the differences mentioned.

In the embodiment illustrated, the after-treatment devices 21–21c are stretching mechanisms. Each of the stretching mechanisms consists, in known manner, of godets 22–22c and 23–23c, to which, in each case, there may be allocated in addition a deflecting roller 24–24c and 25–25c. The profile strand to be treated is wound in each case, and, if need be, several times, around the godet 22–22c as well as its deflection roller so that in this manner there is achieved an adequate friction. The profile strand is then conducted onward over a heating device 31–31c to the godet 23–23c and also wound several times around it as well as around the deflecting roller 25–25c. Finally the profile strands are conducted onward to the winding device 26–26c. The heating device is, in the embodiment illustrated, an electrically heated stationary plate, whose side which is touched by the profile strands is slightly convexly curved. Instead of the heating plate, however, there can be used other heating devices in themselves known for this purpose.

FIG. 1 makes clear the advantages of the arrangement according to the invention. Through the compact construction as well as the splitting up according to the invention of the entire profile bundle 8–8c into a large number of adjacently arranged individual after-treatment paths there has been created a pronouncedly simple installation, whose critical parts are easily accessible during the operation. Furthermore, there is also a further substantial advantage. Practical experience has shown that thread breakages virtually never occur in the first part of the production process. It is not until the subsequent stretching that such faults easily occur. If the latter should occur in the installation according to the invention, then it is no longer necessary largely to stop the entire installation, because in each case at most a single strand or bundle is affected by such a break. Since the corresponding parts of the device are readily accessible without disturbance of the adjacent devices, it is possible to remedy the fault without putting the other parts of the installation out of operation.

Figure 2:
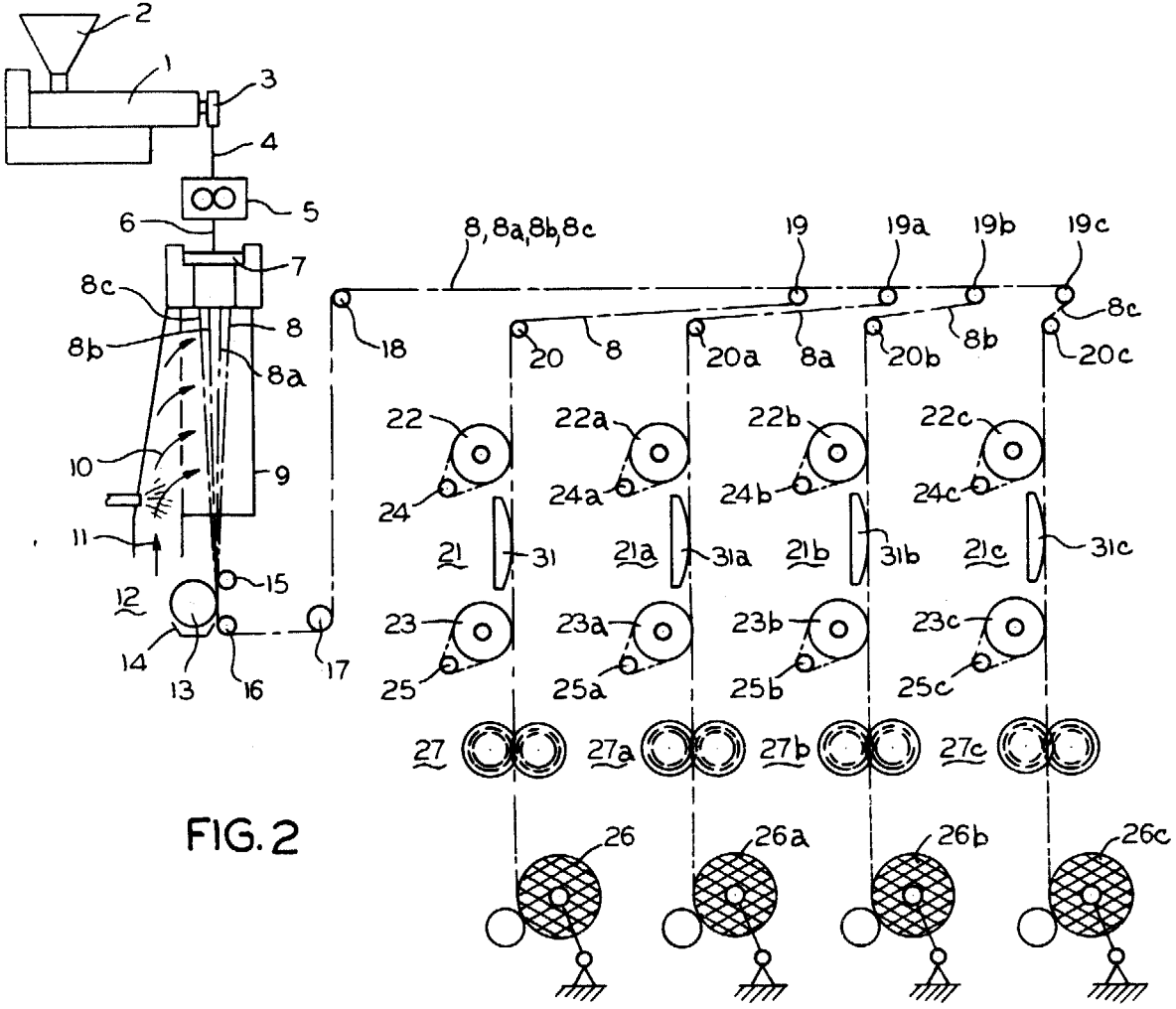
FIG. 2 is a schematic view of an installation corresponding to FIG. 1, in which, for the curling of the individually stretched profile strands, there is provided a gear wheel curling mechanism.

In FIG. 2 the numbering is carried out in the same manner as in FIG. 1. The parts correspond essentially to one another; there it is merely shown that the after-treatment devices 21–21c can be followed by still further treatment devices. In the example represented there is shown a two-gearwheel curling device which is represented in each case at 27, 27a, 27b and 27c. The arrangement of such after-treatment devices is subject to the well-known variations which are available to skilled workers in the field. Thus, for example, it is possible to replace the gearwheel curling device represented in FIG. 2 by twisting devices, for example, false-twist devices or other texturizing devices. Also it is possible to provide the gearwheel arrangement between the two godets 22–22c and 23–23c, respectively. Which of the variations coming in question is chosen is governed according to the nature of the material to be worked, as well as according to the nature of the profile strand structure which is to be generated in each case.

Figure 3:
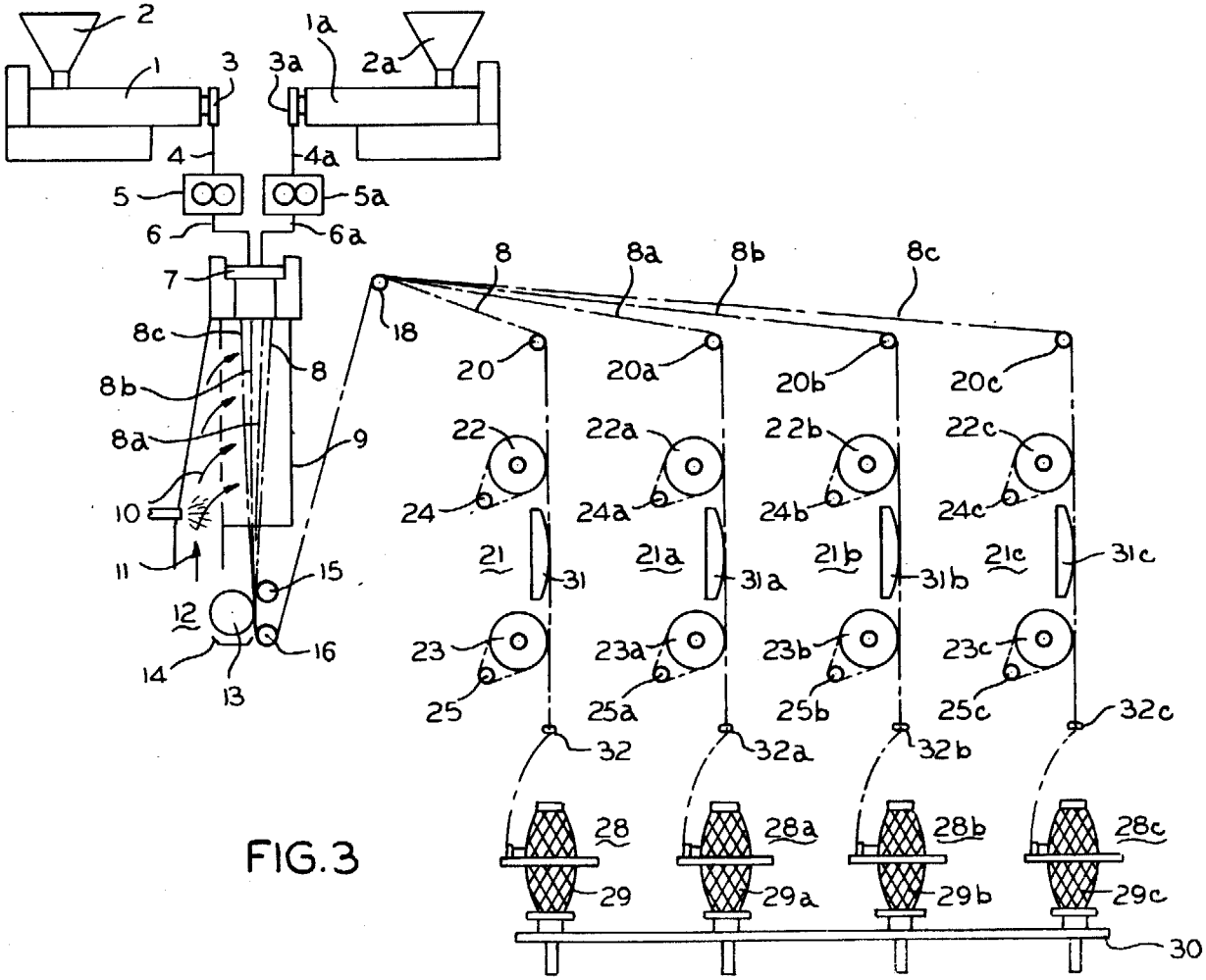
FIG. 3 represents a schematic view of an installation according to the invention, in which at the outlet side of the individual stretching mechanisms there is provided in each case a twist winding device.

In FIG. 3 there is represented another form of execution of the arrangement according to the invention. In order to make it possible to generate bicomponent strands, there are provided two extruders 1 and 1a with in each case separate filling hoppers 2 and 2a, as well as corresponding melt-discharge units 3 and 3a for the molten thermoplastic. The two extruder melt-discharge units are connected over lines 4 and 4a with separate pumps 5 and 5a and from there connected over melt lines 6 and 6a with the common nozzle unit 7. Instead of separate conveyance and metering pumps 5 and 5a there can, of course, be used double pumps, as is known per se. In the interior of the nozzle unit 7 the two plastic streams are fed in a known manner to the profile-forming nozzle openings and there united into a bicomponent strand. The other parts shown in the drawing correspond to those of FIG. 1, so that they are also provided with the same reference numbers. Following upon the stretching mechanisms 21–21c the monofile or multifile ribbon formations are conducted to the guide eyes 32–32c, from where they pass to ring-twist windings devices 28—28c, in themselves known. There they are twisted or twined in a known manner and wound into cops 29–29c.

The ring-twist winding devices are arranged in a known manner on a common rail or bench 30, which can be moved up and down in rhythm—for example hydraulically. These details of the device, however, are not represented in the drawing, since they are not per se the substance of the invention.

Merely by way of example, the strands 8–8c in the arrangement shown in FIG. 3 are conducted in each case directly from 18, i.e., without path-length compensation via loop formation, to the rollers 20–20c of the after-treatment devices. Depending on the required uniformity and the attainable quality, however, here, too, it is possible to use the loop formation represented in the embodiments of FIGS. 1 and 2, and conversely.

In order, if need be, to increase the cooling action on the freshly extruded profile strands and thereby to be able to reduce the structural length of the cooling shaft, it is further proposed that in addition to the blowing cool air that a fine water mist be sprayed into the cooling shaft.

It can also be desired that the freshly extruded profile strands are cooled only to such an extent that they stick together at least in places, and then yield an irregular net-type structure. This can be directly achieved by corresponding shortening of the cooling shaft to, for example, 0.5 to 0.7 m in length.

Finally, the freshly generated profile strand bundle after passing the cooling shaft can also be deflected in such a way that, for the purpose of final fixing, it runs in opposite direction again through the cooling shaft. This is represented in FIG. 4, where the downwardly running strand bundle 8–8c is deflected at roller 32 and then is conducted back upward in the shaft 9 and exits over the roller 33.

The special advantage of the measures proposed according to the invention are seen above all in the stretching units where the prior extremely space-consuming, troublesome section is subdivided into considerably simpler individual units. These are combined with the further-processing devices in common units. Hereby, in the first place, there is achieved an extremely space-saving construction of the entire installation. In the second place there is the further advantage that disturbances unavoidable in the stretching process do not affect the overall production, but rather only the individual part of the after-treatment device is affected. These disturbances can be eliminated with the minimum expenditure in personnel.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. An arrangement for the simultaneous production of a large number of endless bundled profile strands of flat, round or profiled cross section of thermoplastic materials which comprises an extrusion press having an extrusion nozzle unit for simultaneously extruding a plurality of said profile strands perpendicularly downwardly, a cooling shaft therebelow with means for running extruded strands downwardly [and then upwardly] through the shaft *and then upwardly*, said means including at least one deflecting device for the deflecting of the downwardly running, cooled profile strands into the upward running direction, [at least one further deflecting device for the deflecting of the profile strands into the approximately horizontal on a higher plane,] a space saving arrangement of a plurality of [said] after-treatment means with *vertical* contiguous paths for individual strands or sub-groups of said strands, said *after-treatment* means including a large number of [adjacently arranged] *side-by-side*, strand-processing units allocated in each case to a strand or bundle of profile strands, each of which units includes at least a draw-off mechanism, a heating device, a stretching mechanism, and a winding device [and ] *in vertically spaced relationship to each other and providing the respective vertical, contiguous paths for said individual strands or sub-groups of said strands*, said after-treatment means and said winding devices being positioned separate from but near the nozzle unit and cooling [device] *shaft* for after-treating and winding individual strands or sub-groups of strands extruded simultaneously from said nozzle unit *and a plurality of strand-deflecting means above said strand-processing units for guiding said upwardly running profile strands first into a horizontal plane above said units and then, as individual strands or sub-groups of said strands, from said horizontal planes into the respective vertical paths to said after-treatment means.*

2. An arrangement according to claim 1, characterized by a strand-cooling device which is a short cooling shaft having a length sufficient only to provide a partial solidification of the profile strands, and a strand-moistening device at the outlet end of the cooling shaft for the further cooling and simultaneous finishing of the profile strands.

3. An arrangement according to claim 1, characterized by strand-guide means providing path lengths for at least a large number of strands which are approximately equal between the strand-cooling device and the respective after-treatment devices.

4. An arrangement according to claim 3, wherein said guide means comprises a plurality of deflecting devices for the strands or strand bundles.

5. An arrangement according to claim 1 characterized by a texturizing device at the exit end of the stretching mechanisms.

6. An arrangement according to claim 1 characterized by a ring-twist winding device at the outlet end of the stretching mechanisms.

7. An arrangement according to claim 1, characterized by an extrusion press installation for the production of bicomponent profile strands having two extruders adapted to be fed with different thermoplastic materials, and melt-conveyor pumps therefor.

8. An arrangement according to claim 1 wherein said [a] cooling shaft has means for spraying water mist into the shaft.

*9. An arrangement according to claim 1 wherein said first-mentioned means embodies at least one deflecting device for deflecting said downwardly running, cooled profile strands upwardly back into said cooling shaft, and said further deflecting device including deflecting means for deflecting the upwardly running profile strands in said shaft laterally outwardly through an opening in the cooling shaft.*

*10. An arrangement according to claim 9 wherein said deflecting means is positioned in said opening.*

*11. An arrangement according to claim 3 characterized by a texturizing device at the exit end of the stretching mechanisms.*

*12. An arrangement according to claim 3 characterized by a ring-twist winding device at the outlet end of the stretching mechanisms.*

*13. An arrangement according to claim 3 wherein said cooling shaft has means for spraying water mist into the shaft.*

*14. An arrangement according to claim 3 wherein said first-mentioned means embodies at least one deflecting device for deflecting said downwardly running, cooled profile strands upwardly back into said cooling shaft, and said further deflecting device including deflecting means for deflecting the upwardly running profile strands in said shaft laterally outwardly through an opening in the cooling shaft.*

*15. An arrangement according to claim 14 wherein said deflecting means is positioned in said opening.*

*16. An arrangement for the simultaneous production of a large number of endless bundled profile strands of flat, round or profiled cross section of thermoplastic materials which comprises an extrusion press having an extrusion nozzle unit for simultaneously extruding a plurality of said profile strands perpendicularly downwardly, a cooling shaft therebelow with means for running extruded strands downwardly through the shaft and then upwardly, said means including at least one deflecting device for the deflecting of the downwardly running, cooled profile strands into the upward running direction, at least one further deflecting device for the deflecting of the profile strands into the approximately horizontal on a higher plane, a space saving arrangement of a plurality of after-treatment means with contiguous paths for individual strands or sub-groups of said strands, said after-treatment means including a large number of adjacently arranged, strand-processing units allocated in each case to a strand or bundle of profile strands, each of which units includes at least a draw-off mechanism a heating device, a stretching mechanism, and a winding device, and said after-treatment means and said winding devices being positioned separate from but near the nozzle unit and cooling shaft for after-treating and winding individual strands or sub-groups of strands extruded simultaneously from said nozzle unit and further characterized by strand-guide means providing path lengths for at least a large number of strands which are approximately equal between the strand-cooling device and the respective after-treatment devices, said strand guide means embodying said aforementioned deflecting devices and additional strand deflecting devices, said additional strand deflecting devices embodying one strand deflecting member above each of said strand-processing units and other strand deflecting devices for deflecting respective individual strands or sub-groups of said strands to the respective strand deflecting members above each strand processing unit, and said other strand deflecting devices being positioned to provide equal path lengths for the respective individual strands or said sub-groups of strands from said further deflecting device via their respective additional strand deflecting devices to their respective strand-processing units.*

*17. An installation for the continuous production and winding of synthetic, thermoplastic polymer filaments which comprises a first part of said installation in which a plurality of said filaments are spun and solidified, said first part comprising extrusion and nozzle means for extruding a plurality of filaments of a molten, synthetic, thermoplastic polymer, and cooling means to solidify the extruded filaments;*

*a second part of said installation adjacent said first part, said second part comprising a plurality of side-by-side filament treatment means, each treatment means having filament-winding means preceded by first godet means and second godet means forming a filament stretching means;*

*and filament guide means for conducting all of said filaments collectively from said first part to and along a common horizontal path above the plurality of said treatment means and then, as individual filaments or sub-groups of filaments, into separate paths of said individual filaments or said sub-groups thereof running from said horizontal path to the respective first godet means of said respective treatment means, and said filament guide means embodying guide members spatially positioned to provide substantially equal path lengths for the respective filaments between said first part and their respective first godet means.*

* * * * *